US010813021B2

(12) United States Patent
Li et al.

(10) Patent No.: US 10,813,021 B2
(45) Date of Patent: *Oct. 20, 2020

(54) METHOD AND DEVICE FOR RESOURCE CONFIGURATION IN HANDOVER

(71) Applicant: Telefonaktiebolaget LM Ericsson (publ), Stockholm (SE)

(72) Inventors: Yunxi Li, Järfälla (SE); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,328

(22) Filed: Feb. 4, 2019

(65) Prior Publication Data
US 2019/0174376 A1    Jun. 6, 2019

Related U.S. Application Data

(63) Continuation of application No. 15/511,180, filed as application No. PCT/CN2017/074509 on Feb. 23, 2017, now Pat. No. 10,200,921.

(30) Foreign Application Priority Data

Apr. 1, 2016    (WO) ................ PCT/CN2016/078389

(51) Int. Cl.
H04W 36/00    (2009.01)
H04W 36/04    (2009.01)
(Continued)

(52) U.S. Cl.
CPC .......... H04W 36/04 (2013.01); H04W 24/04 (2013.01); H04W 36/0072 (2013.01);
(Continued)

(58) Field of Classification Search
CPC ..... H04W 36/04; H04W 36/18; H04W 36/30; H04W 36/32
(Continued)

(56) References Cited

U.S. PATENT DOCUMENTS 6,490,452 B1    12/2002    Boscovic et al.
6,725,039 B1    4/2004    Parmar et al.
(Continued)

FOREIGN PATENT DOCUMENTS

CN    101998553 A    3/2011
CN    102244907 A    11/2011
(Continued)

OTHER PUBLICATIONS

Communication pursuant to Article 94(3) EPC for Application No. 17709337.4 dated Aug. 23, 2018, 7 pages.
(Continued)

Primary Examiner — Matthew W Genack
(74) Attorney, Agent, or Firm — NDWE LLP

(57) ABSTRACT

A technique relating to resource configuration in a wireless communication network. A terminal device in the wireless communication network receives information about supplemental resource from a source cell. Then the terminal device determines a time interval, in which the supplemental resource is available to the terminal device, in a transition period of a handover from the source cell to a target cell based on a timer associated with a random access procedure in the handover. In this way, the terminal device may use the supplemental resource during the handover.

20 Claims, 5 Drawing Sheets

(51) Int. Cl.
H04W 24/04 (2009.01)
H04W 76/38 (2018.01)
H04W 76/27 (2018.01)
H04W 74/08 (2009.01)

(52) U.S. Cl.
CPC ....... *H04W 74/0833* (2013.01); *H04W 76/27* (2018.02); *H04W 76/38* (2018.02); *H04W 36/03* (2018.08)

(58) Field of Classification Search
USPC .............................................. 455/436–444
See application file for complete search history.

(56) References Cited

U.S. PATENT DOCUMENTS

| | | | |
|---|---|---|---|
| 6,771,964 | B1 | 8/2004 | Einola et al. |
| 2002/0009997 | A1 | 1/2002 | Stuempert et al. |
| 2002/0090975 | A1 | 7/2002 | Laiho et al. |
| 2004/0228491 | A1 | 11/2004 | Wu |
| 2005/0003819 | A1 | 1/2005 | Wu |
| 2010/0099377 | A1 | 4/2010 | Jeong |
| 2010/0118781 | A1* | 5/2010 | Petrovic ................ H04L 1/1887 370/328 |
| 2014/0056278 | A1* | 2/2014 | Marinier ............. H04W 72/044 370/330 |
| 2014/0105183 | A1* | 4/2014 | Choi ........................ H04W 4/70 370/335 |
| 2014/0171085 | A1* | 6/2014 | Li ...................... H04W 36/0061 455/436 |
| 2015/0271717 | A1* | 9/2015 | Moon ................... H04W 76/18 455/437 |
| 2015/0327127 | A1 | 11/2015 | Centonza et al. |
| 2016/0278152 | A1* | 9/2016 | Lei ........................ H04W 76/14 |
| 2017/0070924 | A1 | 3/2017 | Wu et al. |

FOREIGN PATENT DOCUMENTS

| | | |
|---|---|---|
| CN | 104869654 A | 8/2015 |
| CN | 105338548 A | 2/2016 |
| EP | 3439394 A1 | 2/2019 |
| JP | 2019-510436 A | 4/2019 |
| WO | 2015017977 A1 | 2/2015 |
| WO | 2015095583 A1 | 6/2015 |
| WO | 2015/142113 A1 | 9/2015 |
| WO | 2015168937 A1 | 11/2015 |
| WO | 2016/021585 A1 | 2/2016 |
| WO | 2017/167287 A1 | 10/2017 |

OTHER PUBLICATIONS

Ericsson, "Enhancements to Sidelink Mobility," 3GPP TSG-RAN WG2 #94, Tdoc R2-164108, May 23-27, 2016, 3 pages.
Ericsson, "Resource Allocation for Exceptional Pools," 3GPP TSG RAN WG1 meeting #86bis, R1-1609730, Oct. 10-14, 2016, 3 pages.
Examination Report from Bangladesh Application No. 70/2017/4070 dated Nov. 26, 2018, 1 page.
Extended European Search Report for Application No. 17709337.4 dated Aug. 31, 2017, 11 pages.
Final Office Action from U.S. Appl. No. 15/511,180 dated Jun. 11, 2018, 34 pages.
International Preliminary Report on Patentability for Application No. PCT/CN2017/074509 dated Jul. 27, 2018, 24 pages.
International Search Report and Written Opinion for Application No. PCT/CN2017/074509 dated May 17, 2017, 9 pages.
Examination Report from Bangladesh Application No. 70/2017/2787 dated Jul. 3, 2018, 1 page.
Non-Final Office Action from U.S. Appl. No. 15/511,180 dated Nov. 29, 2017, 42 pages.
Notice of Allowance from U.S. Appl. No. 15/511,180 dated Sep. 25, 2018, 15 pages.
Examination Report from Bangladesh Application No. 70/2017/2784, dated Jul. 31, 2018, 1 page.
InterDigital, Discussion on Mobility Enhancements for V2X, 3GPP TSG-RAN WG2#93bis R2-162823, Apr. 11-15, 2016, www.3gpp.org/ftp/tsg_ran/WG2_RL2/TSGR2_93bis/Docs/R2-162406.zip.
Notice of Reasons for Rejection for Japanese Application No. 2018-551442, dated Sep. 3, 2019, 14 pages With English Translation.
ZTE, Study on High Mobility Scenario in V2X, 3GPP TSG-RAN WG2#93bis R2-162406, Apr. 11-15, 2016, www.3gpp.org/ftp/tsg_ran/WG2_RL2/TSGR2_93bis/Docs/R2-162406.zip.
Ericsson et al., "Introduction of T312", 3GPP TSG-RAN WG2 Meeting #85, R2-141023, Prague, Czech Republic, Feb. 10-14, 2014, 15 pages.
Notification of Reason for Refusal, KR App. No. 10-2018-7028315, dated Dec. 16, 2019, 7 pages (3 pages of English Translation and 4 pages of Office Action).
Office Action, IN App. No. 201717008408, dated Feb. 29, 2020, 7 pages.
Office Action, JP App. No. 2018-551442, dated Mar. 3, 2020, 12 pages (6 pages of English Translation and 6 pages of Original Document).
Intention to Grant for EP Application No. 17709337.4, dated Aug. 1, 2019, 76 pages.
Intention to Grant for EP Application No. 17709337.4, dated Dec. 12, 2019, 74 pages.
Decision to Grant for EP Application No. 17709337.4, dated Jan. 8, 2020, 2 pages.
Decision of Refusal for JP Application No. 2018-551442, dated Feb. 25, 2020, 11 pages.
First Office Action for CN Application No. 201780021211.5, dated Jun. 12, 2020, 17 pages.
First Office Action, CN App. No. 201780021211.5, dated Jun. 12, 2020, 11 pages (3 pages of English Translation and 8 pages of Original Document).
Samsung, "Definitions of In-coverage, Out-of-coverage, Edge-of-cell Coverage", 3GPP TSG RAN WG1 #77, R1-142114, May 19-May 23, 2014, 4 pages.

* cited by examiner

METHOD AND DEVICE FOR RESOURCE CONFIGURATION IN HANDOVER

CROSS-REFERENCE TO RELATED APPLICATIONS

This application is a continuation of U.S. application Ser. No. 15/511,180, filed Mar. 14, 2017, which is a National stage of International Application No. PCT/CN2017/074509, filed Feb. 23, 2017, which claims priority to International Application No. PCT/CN2016/078389, filed Apr. 1, 2016, which are all hereby incorporated by reference.

TECHNICAL FIELD

Embodiments of the present disclosure generally relate to the field of communications, and more particularly, to a method and device for resource scheduling in handover (HO).

BACKGROUND

Wireless communication systems are advancing to provide good service quality, support a high data rate and keep up with the continuously increasing demand for wireless data traffic. The wireless communication systems, such as a Long Term Evolution (LTE) system, have been extended with support of device to device (D2D) features targeting both commercial and Public Safety applications. Some applications enabled by LTE are device discovery, where devices are able to sense the proximity of another device and associated application by broadcasting and detecting discovery messages that carry device and application identities. Another application consists of direct communication based on physical channels terminated directly between devices. In 3GPP, all of these applications are defined under the umbrella of Proximity Services (ProSe).

One of the potential extensions of the ProSe framework consists of support of V2X communication, which includes any combination of direct communication between vehicles, pedestrians and infrastructure. The V2X communication may include V2V communication, V2P communication, V2I communication, and the like. In particular, the V2V is also referred to as vehicle-to-vehicle, which covers LTE-based communication between vehicles, the V2P is also referred to as vehicle-to-pedestrian, which covers LTE-based communication between a vehicle and a device carried by an individual (e.g. handheld terminal carried by a pedestrian, cyclist, driver or passenger), and the V2I is also referred to as vehicle-to-infrastructure which covers LTE-based communication between a vehicle and a roadside unit/network. V2X communication may take advantage of a NW infrastructure, when available, but at least basic V2X connectivity should be possible even in case of lack of coverage. Providing an LTE-based V2X interface may be economically advantageous because of the LTE economies of scale and it may enable tighter integration between communications with the V2I, V2P and V2V communications.

From V2X perspective, a handover procedure of a terminal device may include a detach phase in which the terminal device detaches from its source cell and has not been connected to its target cell, and an abnormal phase in which the terminal device is connected to the target cell, but cannot use the resource in the target cell for V2X transmission. During the detach phase, the terminal device can neither obtain resource from the source cell nor the target cell for V2X transmission. At the same time, the terminal device is under network coverage, it cannot use pre-configured resources as a UE out of coverage can use. As a result, there will be service interruption during this phase, and the interruption time can be up to, for example, 2 seconds, which will be unacceptable for some V2X services.

SUMMARY

In general, embodiments of the present disclosure provide a solution for resource configuration in a wireless communication network.

In a first aspect, a method at least partially implemented by a terminal device in a wireless communication network is provided. The terminal device receives information about supplemental resource from a source cell. Then the terminal device determines a time interval, in which the supplemental resource is available to the terminal device, in a transition period of a handover from the source cell to a target cell based on a timer associated with a random access procedure in the handover. The corresponding computer program is also provided.

In one embodiment, determining the time interval may include: determining a time point when the timer is started as a beginning of the time interval; and determining an end of the time interval based on a state of the timer.

In one embodiment, determining the end of the time interval may include: in response to the timer being stopped before expiring, determining a time point when the timer is stopped as the end of the time interval.

In one embodiment, determining the end of the time interval may include: in response to the timer being stopped before expiring, determining a time point when Radio Resource Control (RRC) connection reconfiguration is received as the end of the time interval.

In one embodiment, determining the end of the time interval may include: in response to the timer expiring, determining a time point when the timer expires as the end of the time interval.

In one embodiment, determining the end of the time interval may include: in response to the timer expiring, determining a time point when a further timer associated with a cell selection procedure is stopped or expires as the end of the time interval, the cell selection procedure being performed after the random access procedure.

In one embodiment, the method may further include: adjusting the timer according to at least one of: Global Navigation Satellite System (GNSS) timing, and common timing of the wireless communication network.

In one embodiment, determining the time interval may include: in response to the timer being stopped before expiring, determining a time point when the timer is stopped as a beginning of the time interval; and determining a time point when RRC connection reconfiguration is received as an end of the time interval.

In one embodiment, the method may further include: adjusting the timer according to at least one of: GNSS timing, common timing of the wireless communication network and timing of the target cell.

In a second aspect, a method at least partially implemented by a network device in a wireless communication network is provided. The network device transmits information about supplemental resource to a terminal device, to enable the terminal device to determine, based on a timer associated with a random access procedure in a handover of the terminal device, a time interval in a transition period of the handover. The supplemental resource is available to the terminal device in the determined time interval. The corresponding computer program is also provided.

In a third aspect, an apparatus at least partially implemented at a terminal device in a wireless communication network is provided. The apparatus includes a receiver and a controller. The receiver is configured to receive information about supplemental resource from a source cell. The controller is configured to determine, based on a timer associated with a random access procedure in a handover from the source cell to a target cell, a time interval in a transition period of the handover, the supplemental resource being available to the terminal device in the determined time interval.

In a fourth aspect, an apparatus at least partially implemented at a network device in a wireless communication network is provided. The network device includes a transmitter. The transmitter is configured to transmit information about supplemental resource to a terminal device, to enable the terminal device to determine, based on a timer associated with a random access procedure in a handover of the terminal device, a time interval in a transition period of the handover, the supplemental resource being available to the terminal device in the determined time interval.

In a fifth aspect, a device is provided. The device includes: a processor and a memory, the memory containing instructions executable by the processor, whereby the processor being adapted to cause the device to: receive information about supplemental resource from a source cell; and determine, based on a timer associated with a random access procedure in a handover from the source cell to a target cell, a time interval in a transition period of the handover, the supplemental resource being available to the terminal device in the determined time interval.

In a sixth aspect, a device is provided. The device includes: a processor and a memory, the memory containing instructions executable by the processor, whereby the processor being adapted to cause the terminal device to: transmit information about supplemental resource to a terminal device, to enable the terminal device to determine, based on a timer associated with a random access procedure in a handover of the terminal device, a time interval in a transition period of the handover, the supplemental resource being available to the terminal device in the determined time interval.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a base station (BS), an access point (AP), a mobile management entity, a server, and any other suitable device in the wireless communication network. The network device may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to user equipment (UE), which may be a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), and the like.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
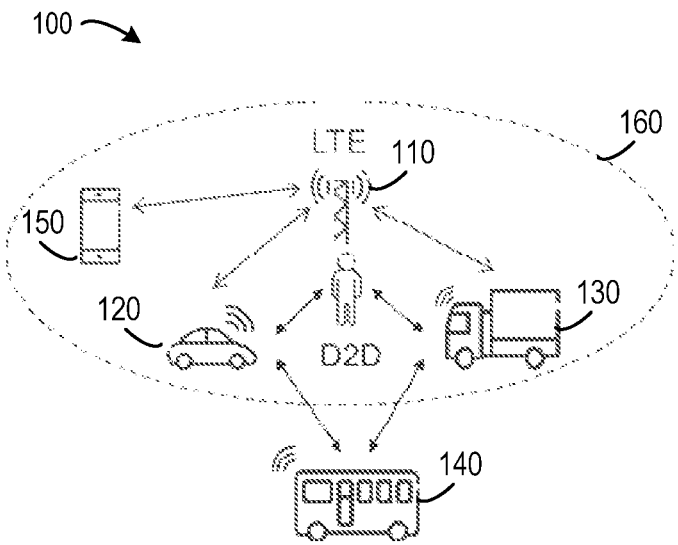
FIG. 1 shows an environment of a wireless communication network 100 in which embodiments of the present disclosure may be implemented.

Now some exemplary embodiments of the present disclosure will be described below with reference to the figures. Reference is first made to FIG. 1, which illustrates an environment of a wireless communication network 100 in which embodiments of the present disclosure may be implemented. As shown in FIG. 1, the wireless communication network 100 is illustrated as a LTE network in which D2D communication is performed between terminal devices. In particular, a network device 110 (also referred to as a "BS 110" hereafter) manages a serving cell 160 that serves three terminal devices 120, 130 and 150 in the LTE network, and the terminal devices 120, 130 and 140 perform D2D communication or V2X communication.

It is to be understood that the configuration of FIG. 1 is described merely for the purpose of illustration, without suggesting any limitation as to the scope of the present disclosure. Those skilled in the art will appreciate that the wireless communication network 100 may include any suitable number of terminal devices and BSs and may have other suitable configurations.

Figure 2:
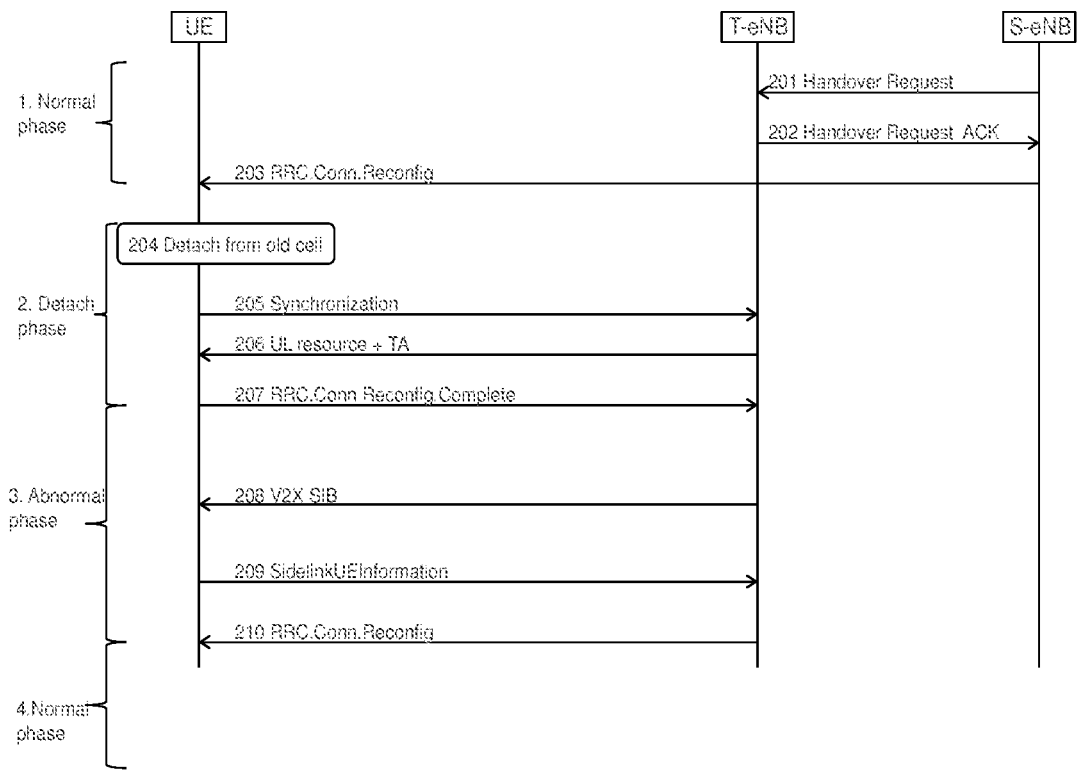
FIG. 2 shows a diagram of flow 200 of a handover procedure.

Conventionally, several phases may be involved in the handover of the terminal device 120 from the serving cell (also referred to as "source cell" hereafter) to a new cell (also referred to as "target cell" hereafter). FIG. 2 shows a diagram of flow 200 of a handover procedure. In FIG. 2, UE indicates the terminal device 120, S-eNB (also referred to as the "source eNB" hereafter) indicates the network device 110 or the source BS, and the T-eNB (also referred to as the "target eNB" hereafter) indicates a target BS that manages the target cell of the handover. Four phases are illustrated in the example of FIG. 2 as follows:

1. Normal Phase: During this phase, UE is connected to source eNB and can transmit V2X data using either mode1 resources or mode2 resources. Phase 1 starts with sending 201 a handover request from the S-eNB to the T-eNB. Then the T-eNB sends 202 a handover request acknowledgment (ACK) to the S-eNB. Phase 1 finishes when UE receives 203, from the S-eNB, RRCConnectionReconfiguration including mobility information.

2. Detach Phase: This phase starts from UE detaching 204 from the S-eNB to UE being connected to the T-eNB (step 207). In particular, after detaching from the S-eNB, the UE sends 205 a message for synchronization to the T-eNB. Upon receiving the synchronization message, the T-eNB sends 206 uplink (UL) resource and Timing Advance (TA) to the UE. Then, the UE sends 207 RRCConnectionRegonfigurationComplete to the T-eNB. During this phase, UE is not connected to any eNB.

3. Abnormal phase: During this phase, UE is connected to the target BS, but cannot use the resources from target BS for V2X transmission.

If UE is going to use mode2 resource, abnormal phase will be from step 207 to step 208 where V2X System Information Block (SIB) is received from the T-eNB. During this phase, UE is connected to the target BS, but cannot use mode2 resources to perform V2X transmission, as V2X mode2 resource pool is not obtained by UE.

If UE is going to use mode1 resource, abnormal phase will be from step 207 to step 210. (In ProSe, SidelinkUE-Information was defined for UE to obtain necessary information from eNB for mode1 resource allocation. It is assumed this message will be reused by V2X). In this phase, after receiving 208 V2X SIB from the T-eNB, the UE sends 209 SidelinkUEInformation to the T-eNB, and then receives 210 RRCConnectionReconfiguration from the T-eNB. During this phase, UE is connected to target eNB, but cannot use mode1 resources to perform V2X transmission, as some necessary information of mode1 resource allocation is still missing from UE side.

4. Normal phase: UE is connected to target eNB and can use resources from target eNB to transmit V2X data. If UE is going to use mode2 resource, this phase starts from step 208. If UE is going to use mode1 resources, this phase starts from step 210.

However, during "2 Detach phase", UE cannot obtain resources for V2X transmission, neither from the source BS nor from the target BS. At the same time, UE is under network coverage, it cannot use pre-configured resources as what a UE out of coverage will use. As a result, there will be service interruption during this phase, and the interruption time can be up to 2 seconds, which will be unacceptable for some V2X services.

Recently, studies have been made for addressing this problem. One solution (also referred to as "solution #1") is to use the resources of the source eNB, i.e. UE will continue using resources of source eNB after detached from source eNB. However, there are quite a few drawbacks.

First, there is interference to target eNB. During this phase, the UE may have been in the coverage of target eNB, e.g. when UE performs step 5, 6 and 7. The V2X resource pool can be not aligned between source eNB and target eNB. The V2X resources in source eNB can be used to schedule LTE traffic in target eNB. As a result, UE using the resources of source eNB may lead to interference to target eNB. Considering the duration of this phase can be up to 2 seconds, the impact can be critical.

Second, resources may be wasted. During this phase, the UE is unconnected to source eNB, i.e. source eNB has no idea about when this phase will stop. eNB has to reserve the resources for the UE minimum 2 seconds to make it work for all cases. When this phase is short, e.g. tens of ms, some resources will be waste.

Another solution (also referred to as "solution #2") is to use the resources of target eNB. That is, the target eNB can provide some resources to UE via Handover Command message, and UE can use these resources during "2 Detach phase". There are similar drawbacks with solution #1.

Figure 3:
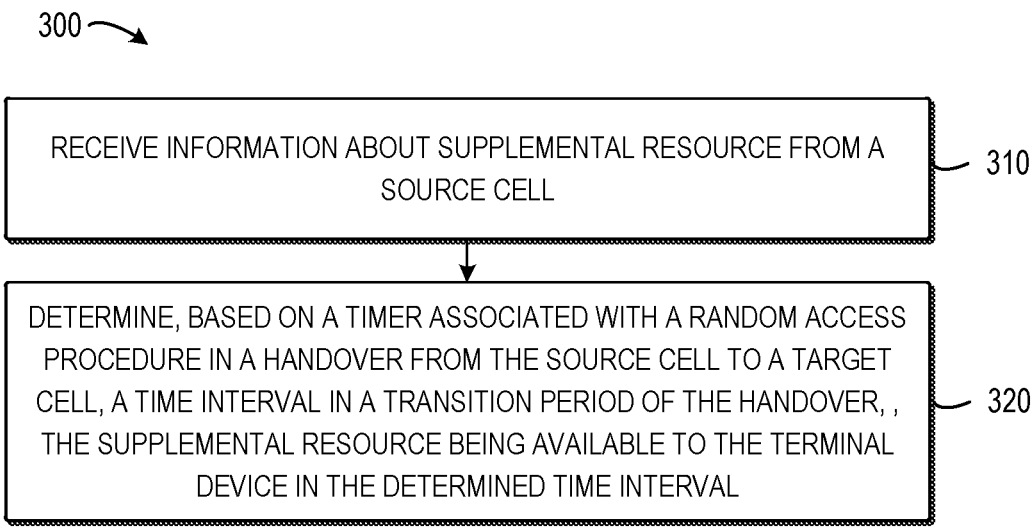
FIG. 3 shows a flowchart of a method 300 for resource configuration implemented by a terminal device in accordance with an embodiment of the present disclosure.

In order to solve the above and other potential problems, embodiments of the present disclosure provide solutions on resource configuration during the handover. FIG. 3 shows a flowchart of a method 300 for resource configuration implemented by a terminal device in accordance with an embodiment of the present disclosure. With the method 300, the above and other potential deficiencies in the conventional approaches can be overcome. It would be appreciated by those skilled in the art that the method 300 may be implemented by a terminal device, such as the terminal device 120 or other suitable devices. For the purpose of illustration, the method 300 will be described below with reference to the terminal device 120 in the wireless communication system 100.

The method 300 is entered in block 310, where information about supplemental resource is received from a source cell. The supplemental resource refers to the resource available to the terminal device during at least a portion of a transition period of the handover. The transition period indicates a period of time for performing the handover, for example, from the time point of receiving 203 the RRCConnectionReconfiguration message from the source cell to the time point of receiving 210 the RRCConnectionReconfiguration message from the target cell, as shown in the example of FIG. 2. In some embodiments of the present disclosure, the supplemental resource is pre-configured or configured by the serving cell of the terminal device before handover. The supplemental resource takes effect according to a specific timer and/or a specific event during the handover. The timing of the supplemental resource may follow Global Navigation Satellite System (GNSS) timing reference or a common timing reference (if universal timing in the system) or target cell timing (if different timing in the system). The supplemental resource cannot be used by LTE traffic in serving/target cell for interference avoidance.

In some embodiments, the supplemental resource may be implemented as a resource pool which includes one or more time/frequency resource blocks, for example, Physical Resource Blocks (PRBs). The supplemental resource may be notified by the source cell, for example, in a HO command (dedicated RRC signaling), SIB (broadcast RRC signaling), or the like.

In block 320, a time interval is determined in a transition period of a handover from the source cell to a target cell based on a timer associated with a random access procedure in the handover. The timer may have different states, such as a stopping state, an expiring state, and so on. If the timer is stopped, namely, the timer enters a stopping state, it can be determined that the random access procedure is successful. If the timer expires, namely, the timer enters an expiring state, it can be determined that the random access procedure is failed. In some embodiments, the timer may be T304 or other suitable timer that has been already defined.

The time interval refers to a portion of the transition period in which the supplemental resource is available to the terminal device. According to embodiments of the present disclosure, there may be a variety of ways to determine the time interval.

Figure 5:
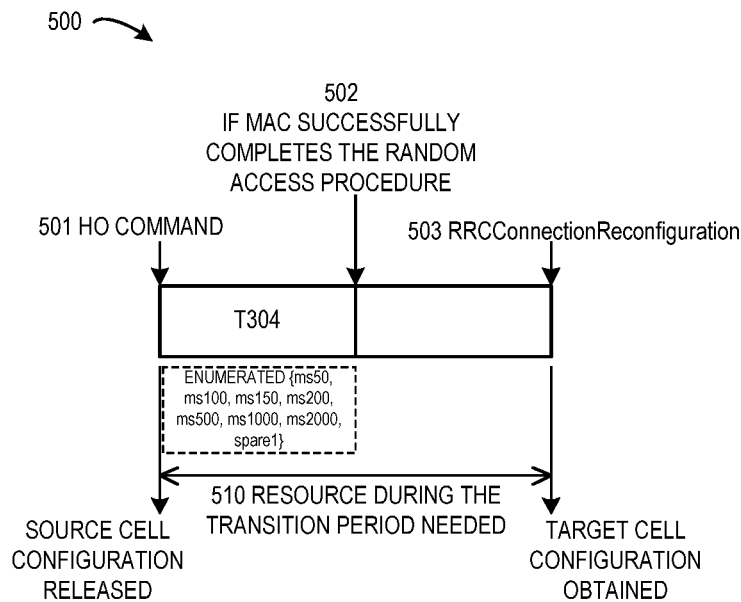
FIG. 5 shows a diagram 500 of a successful handover procedure in accordance with an embodiment of the present disclosure.
Figure 6:
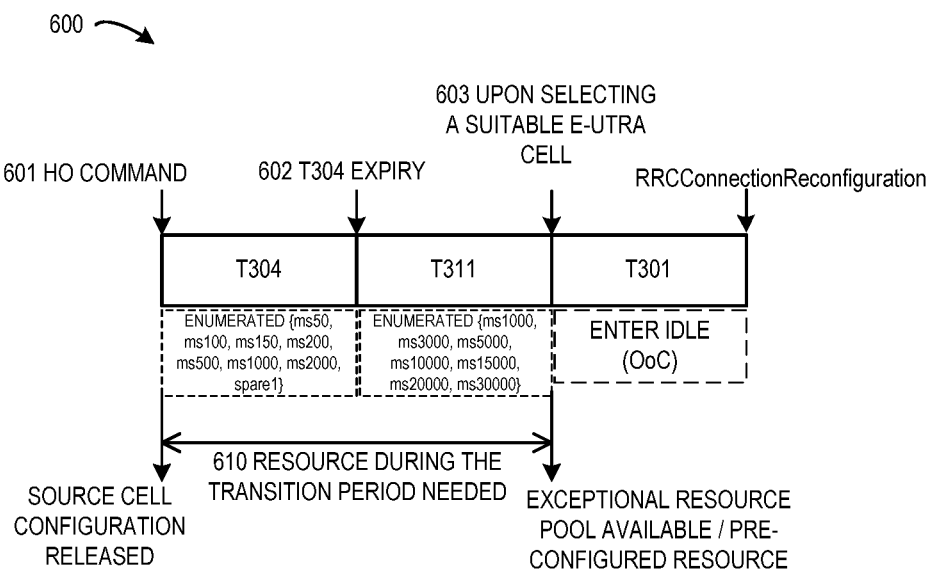
FIG. 6 shows a diagram 600 of a handover failure procedure in accordance with an embodiment of the present disclosure.

In some embodiments, a time point when the timer is started may be determined as a beginning of the time interval, and an end of the time interval may be determined based on a state of the timer. FIG. 5 shows a diagram 500 of a successful handover procedure in accordance with an embodiment of the present disclosure. In the example of FIG. 5, the beginning of the time interval may be the time point 501 at which the timer T304 is started, and the transition period is indicated by 510. In some embodiments, the time point 501 may corresponded to a time point at which a RRCConnectionReconfiguration message is received from the source cell. FIG. 6 shows a diagram 600 of a handover failure procedure in accordance with an embodiment of the present disclosure. In the example of FIG. 6, the beginning of the time interval may be the time point 601 at which the timer T304 is started, and the transition period is indicated by 610 which starts from the time point 601 to the time point 603. The time point 603 indicates a time point at which a new cell is selected. In an alternative embodiment, the transition period 610 may start from the time point 601 and ends at the time point 602. The time point 602 indicates a time point at which the timer T304 expires.

The end of the time interval may be determined based on the state of the timer in multiple ways. In an embodiment, in response to the timer being stopped before expiring, a time point when the timer is stopped may be determined as the end of the time interval. In the example of FIG. 5, the end of the time interval may be the time point 502 at which the timer T304 is stopped when the random access procedure is successfully completed.

Alternatively, in an embodiment, in response to the timer being stopped before expiring, a time point when RRC connection reconfiguration is received may be determined as the end of the time interval. In the example of FIG. 5, the end of the time interval may be the time point 503 at which the RRCConnectionReconfiguration message is received.

Alternatively, in an embodiment, in response to the timer expiring, a time point when the timer expires may be determined as the end of the time interval. In the example of FIG. 6, the end of the time interval may be the time point 602 at which the timer T304 expires.

Alternatively, in an embodiment, in response to the timer expiring, a time point when a further timer associated with a cell selection procedure is stopped or expires may be determined as the end of the time interval. The further timer may be T311. The cell selection procedure may be performed after the random access procedure. In the example of FIG. 6, the end of the time interval may be the time point 603 at which the timer T311 is stopped when a suitable E-UTRA cell is selected.

As an alternative, the beginning of the time interval may be not the same as the starting time of the timer. In some embodiments, in response to the timer being stopped before expiring, a time point when the timer is stopped may be determined as a beginning of the time interval. In this case, a time point when RRC connection reconfiguration is received may be determined as an end of the time interval. In the example of FIG. 5, the beginning of the time interval may be the time point 502 when the timer T304 is stopped, and the end of the time interval may be the time point 503 at which a RRCConnectionReconfiguration message is received.

According to embodiments of the present disclosure, optionally, the timer may be adjusted according to GNSS timing, common timing of the wireless communication network, and/or the like. The common timing may be, for example, a universal timing in the wireless communication network, or a timing commonly used by both the target cell and the source cell. In embodiments where the timer is stopped before expiring, that is, the random access procedure is successful, the timer may be adjusted according to the GNSS timing, the common timing of the wireless communication network, timing of the target cell (if there are different timings in the wireless communication network), and/or the like.

As discussed above, according to embodiments of the present disclosure, the supplemental resource can be available to the terminal device during the time interval in the transition period of the handover. In this way, the V2X communication can be not affected by the handover. In addition, using the supplemental resource during handover can avoid the interference to the LTE traffic in neighboring cells or the cells in proximity. Furthermore, overlapping the supplemental resource with ordinary V2X resources can improve resource utilization.

Figure 4:
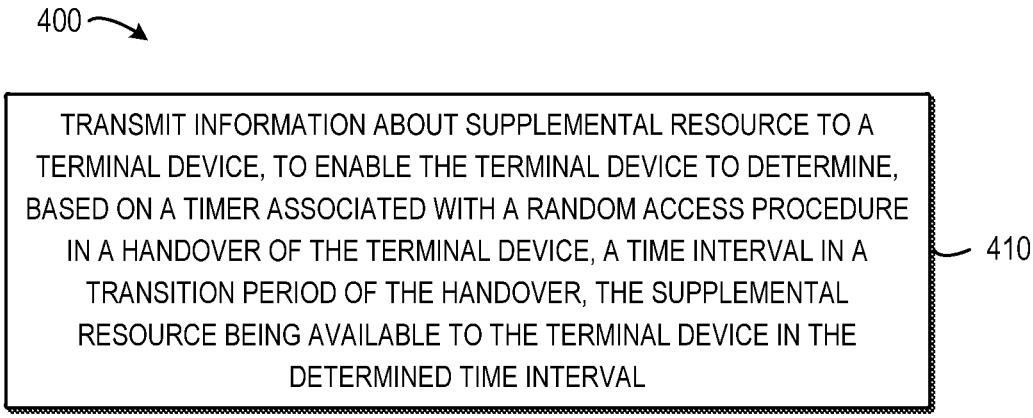
FIG. 4 shows a flowchart of a method 400 for resource configuration implemented by a network device in accordance with an embodiment of the present disclosure.

Reference is now made to FIG. 4, which shows a flowchart of a method 400 for resource configuration implemented by a network device in accordance with an embodiment of the present disclosure. It would be appreciated by those skilled in the art that the method 400 may be implemented by a network device, such as the BS 110 or other suitable devices. For the purpose of illustration, the method 400 will be described below with reference to the BS 110 in the wireless communication system 100.

The method 400 is entered in block 410, where information about supplemental resource is transmitted to a terminal device, to enable the terminal device to determine, based on a timer associated with a random access procedure in a handover of the terminal device, a time interval in a transition period of the handover. The supplemental resource is available to the terminal device in the determined time interval.

According to embodiments of the present disclosure, the supplemental resource may be implemented as a resource pool which includes one or more time/frequency resource blocks, for example, PRBs. The supplemental resource may be pre-configured or configured by the serving cell before handover. In some embodiments, the supplemental resource may be notified by the source cell to the terminal device, for example, in a HO command (dedicated RRC signaling), SIB (broadcast RRC signaling), or the like.

Upon receipt of the information of the supplemental resource, the terminal device, for example, the terminal device 120 of FIG. 1, may perform the method 300 to determine the time interval in which the supplemental resource is available for use.

Now more details of some embodiments will be described with respect to FIGS. 5 and 6.

Embodiment 1: Supplemental Resource is to be Used Based on a Timer During the Transition Period As shown in FIG. 5, conventionally, if HO is successful, the resource configuration of serving cell would be released since HO command is received from source cell, and the resource configuration of target cell would be obtained after RRCConnectionReconfiguration from target cell, i.e., no clear resource definition during the transition period. In the example of FIG. 6, if HO fails, there is no resource available as well at least during T304 time period, no matter whether RRC connection re-establishment is successful or not.

According to embodiments of the present disclosure, in embodiment 1, the resource usage may include the following steps.

Step 1: the supplemental resource (time/frequency domain definition, limited one time/frequency resource or resource set/pool) is notified by the source cell, either in HO command (dedicated RRC signaling) or SIB (broadcast RRC signaling).

Step 2: the resource is to be used by the UE since T304 is started, referring to a universal timing (either GNSS or a common timing used by whole system). There may be multiple cases where the usage of the resource would be stopped:

Stopped when the MAC layer has successfully done the random access procedure;
Stopped when the RRC connection reconfiguration is received from the target cell;
Stopped when T304 expires; or
Stopped when T311 stops/expires (in this case, the supplemental resource may be continued to be used when T304 expires).

Step 3: afterwards, new resource may be available. In some embodiments, the new resource may be implemented as resource configured by target cell (carried in RRC connection reconfiguration, or SIB in target cell, or the like). In some alternative embodiments, the new resource may be configured for out of coverage case, if HO fails as described in FIG. 6. In the example of FIG. 6, the new resource (for example, an exceptional resource pool or preconfigured resource) may be available after the time point 603, and may be associated with a new timer, for example, T301. In another example where the transition period starting from the time point 601 and ending at the time point 602, the exceptional resource pool may be available after the time point 602.

Embodiment 2: Supplemental Resource is to be Used Based on an Event Associated with the Timer During the Transition Period As shown in FIG. 6, the timer T304 started after HO command may be seen as an uncertain period. For example, it may either end with HO failure (no matter RRC connection re-establishment is successful or not) or HO success. So if considering the resources can be configured from target cell perspective, and different timing is used by different eNBs, this resource would be used after successful connection with target cell.

So in this embodiment, the resource usage may include the following steps.

Step 1: the supplemental resource (time/frequency domain definition, limited one t/f resource or resource set/pool) is notified by source cell, either in HO command (dedicated RRC signaling) or SIB (broadcast RRC signaling).

Step 2: the supplemental resource is to be used by the UE since random access is successful at MAC layer, referring to the timing of a target cell.

Step 3: the supplemental resource may be stopped when RRC connection reconfiguration is received, where new resource configuration is included.

Figure 7:
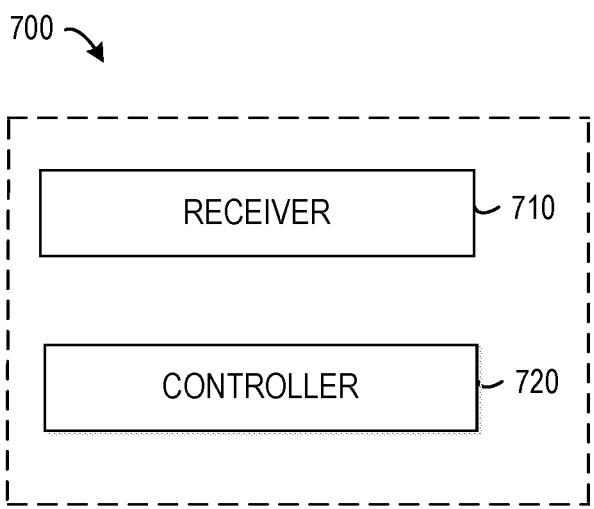
FIG. 7 shows a block diagram of a terminal device 700 in accordance with an embodiment of the present disclosure.

FIG. 7 shows a block diagram of a terminal device 700 in accordance with an embodiment of the present disclosure. It would be appreciated that the terminal device 700 may be implemented by the terminal device 120 as shown in FIG. 1 or other suitable devices.

As shown, the terminal device 700 includes a receiver 710 and a controller 720. The receiver 710 is configured to receive information about supplemental resource from a source cell. The controller 720 configured to determine, based on a timer associated with a random access procedure in a handover from the source cell to a target cell, a time interval in a transition period of the handover, the supplemental resource being available to the terminal device in the determined time interval.

In an embodiment, the controller 720 is further configured to: determine a time point when the timer is started as a beginning of the time interval; and determine an end of the time interval based on a state of the timer.

In an embodiment, the controller 720 is further configured to: in response to the timer being stopped before expiring, determine a time point when the timer is stopped as the end of the time interval.

In an embodiment, the controller 720 is further configured to: in response to the timer being stopped before expiring, determine a time point when RRC connection reconfiguration is received as the end of the time interval.

In an embodiment, the controller 720 is further configured to: in response to the timer expiring, determine a time point when the timer expires as the end of the time interval.

In an embodiment, the controller 720 is further configured to: in response to the timer expiring, determine a time point when a further timer associated with a cell selection procedure is stopped or expires as the end of the time interval, the cell selection procedure being performed after the random access procedure.

In an embodiment, the controller 720 is further configured to: adjust the timer according to at least one of: GNSS timing, and common timing of the wireless communication network.

In an embodiment, the controller 720 is further configured to: in response to the timer being stopped before expiring, determine a time point when the timer is stopped as a beginning of the time interval; and determine a time point when RRC connection reconfiguration is received as an end of the time interval.

In an embodiment, the controller 720 is further configured to: adjust the timer according to at least one of: GNSS timing, common timing of the wireless communication network, and timing of the target cell.

In an embodiment, the timer may be T304.

Figure 8:
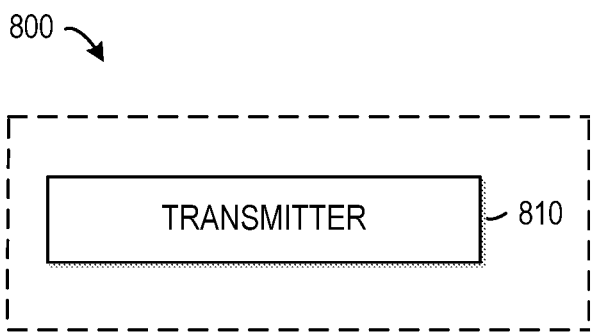
FIG. 8 shows a block diagram of a network device 800 in accordance with an embodiment of the present disclosure.

FIG. 8 shows a block diagram of a network device 800 in accordance with an embodiment of the present disclosure. It would be appreciated that the network device 800 may be implemented by the BS 110 as shown in FIG. 1 or other suitable devices.

As shown, the network device 800 includes a transmitter 810 configured to transmit information about supplemental resource to a terminal device, to enable the terminal device to determine, based on a timer associated with a random access procedure in a handover of the terminal device, a time interval in a transition period of the handover, the supplemental resource being available to the terminal device in the determined time interval.

It should be appreciated that components included in the terminal device 700 correspond to the blocks of the method 300, and components included in the network device 800 correspond to the blocks of the method 400. Therefore, all operations and features described above with reference to FIG. 3 are likewise applicable to the components included in the terminal device 700 and have similar effects, and all operations and features described above with reference to FIG. 4 are likewise applicable to the components included in the network device 800 and have similar effects. For the purpose of simplification, the details will be omitted.

The components included in the terminal device 700 and the network device 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the terminal device 700 and the network device 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented in a wireless communication network. It would be appreciated that the apparatus may be implemented at a terminal device. The apparatus includes: means for receiving information about supplemental resource from a source cell; and means for determining, based on a timer associated with a random access procedure in a handover from the source cell to a target cell, a time interval in a transition period of the handover, the supplemental resource being available to the terminal device in the determined time interval.

In an embodiment, the means for determining the time interval includes: means for determining a time point when the timer is started as a beginning of the time interval; and means for determining an end of the time interval based on a state of the timer.

In an embodiment, the means for determining the end of the time interval includes: means for, in response to the timer being stopped before expiring, determining a time point when the timer is stopped as the end of the time interval.

In an embodiment, the means for determining the end of the time interval includes: means for, in response to the timer being stopped before expiring, determining a time point when RRC connection reconfiguration is received as the end of the time interval.

In an embodiment, the means for determining the end of the time interval includes: means for, in response to the timer expiring, determining a time point when the timer expires as the end of the time interval.

In an embodiment, the means for determining the end of the time interval includes: means for, in response to the timer expiring, determining a time point when a further timer associated with a cell selection procedure is stopped or expires as the end of the time interval, the cell selection procedure being performed after the random access procedure.

In an embodiment, the apparatus further includes: means for adjusting the timer according to at least one of: GNSS timing, and common timing of the wireless communication network.

In an embodiment, the means for determining the time interval includes: means for, in response to the timer being stopped before expiring, determining a time point when the timer is stopped as a beginning of the time interval; and means for determining a time point when RRC connection reconfiguration is received as an end of the time interval.

In an embodiment, the apparatus further includes: means for, adjusting the timer according to at least one of: GNSS timing, common timing of the wireless communication network, and timing of the target cell.

In an embodiment, the timer may be T304.

In accordance with embodiments of the present disclosure, there is provided an apparatus implemented in a wireless communication network. It would be appreciated that the apparatus may be implemented at a network device. The apparatus includes: means for transmitting information about supplemental resource to a terminal device, to enable the terminal device to determine, based on a timer associated with a random access procedure in a handover of the terminal device, a time interval in a transition period of the handover, the supplemental resource being available to the terminal device in the determined time interval.

Figure 9:
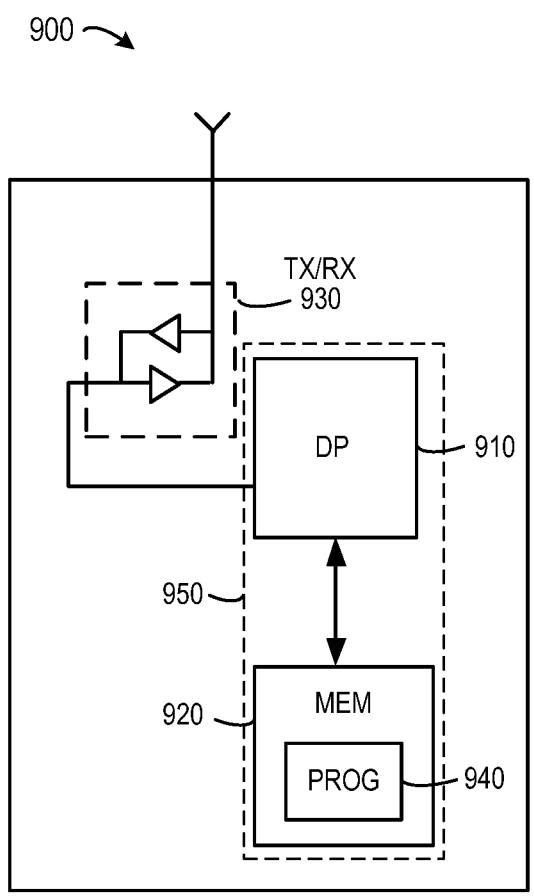
FIG. 9 shows a simplified block diagram 900 of a device that is suitable for use in implementing embodiments of the present disclosure.

FIG. 9 shows a simplified block diagram of a device 900 that is suitable for use in implementing embodiments of the present disclosure. It would be appreciated that the device 900 may be implemented by a network device, such as, the BS 110, or a terminal device, for example the terminal device 120.

As shown, the device 900 includes a data processor (DP) 910, a memory (MEM) 920 coupled to the DP 910, a suitable RF transmitter TX and receiver RX 940 coupled to the DP 910, and a communication interface 950 coupled to the DP 910. The MEM 920 stores a program (PROG) 930. The TX/RX 940 is for bidirectional wireless communications. Note that the TX/RX 940 has at least one antenna to facilitate communication, though in practice an Access Node mentioned in this application may have several ones. The communication interface 950 may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The PROG 930 is assumed to include program instructions that, when executed by the associated DP 910, enable the device 900 to operate in accordance with the embodiments of the present disclosure, as discussed herein with the method 300 in FIG. 3 or the method 400 in FIG. 4. The embodiments herein may be implemented by computer software executable by the DP 910 of the device 900, or by hardware, or by a combination of software and hardware. A combination of the data processor 910 and MEM 920 may form processing means 960 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device for use in a wireless communication network, comprising:
   receiving information about a supplemental resource from a source cell of the wireless communication network; and
   determining a time interval in a portion of a transition period of a handover of the terminal device from the source cell to a target cell, in which the supplemental resource is available to the terminal device during the time interval, wherein a first timer and the time interval commence at a receiving of a connection reconfiguration message from the source cell, wherein when the first timer expires without the terminal device completing target cell selection, utilizing a second timer to add time to the first timer to continue the time interval for target cell selection, and wherein the time interval ends upon successful target cell selection or upon expiry of the second timer.

2. The method of claim 1, wherein the supplemental resource is for use in device-to-device communication during handover of the terminal device from the source cell to the target cell.

3. The method of claim 2, wherein the first timer is T304.

4. The method of claim 3, wherein the second timer is T311.

5. The method of claim 2 further comprising determining a second time interval commencing upon unsuccessful target cell selection at the expiry of the second timer, in which a new resource for use in device-to-device communication is made available to the terminal device, wherein the second time interval expires upon expiry of a third timer.

6. The method of claim 5, wherein the third timer is T301.

7. The method of claim 5, wherein the first timer is T302, the second timer is T311, and the third timer is T301.

8. The method of claim 5, further comprising receiving information about the new resource from the target cell of the wireless communication network.

9. An apparatus implemented at a terminal device for use in a wireless communication network, comprising:
   a receiver configured to receive information about a supplemental resource from a source cell of the wireless communication network; and
   a controller configured to determine a time interval in a portion of a transition period of a handover of the terminal device from the source cell to a target cell, in which the supplemental resource is available to the terminal device during the time interval, wherein a first timer and the time interval commence at a receiving of a connection reconfiguration message from the source cell, wherein when the first timer expires without the terminal device completing target cell selection, utilize a second timer to add time to the first timer to continue the time interval for target cell selection, and wherein the time interval ends upon successful target cell selection or upon expiry of the second timer.

10. The apparatus of claim 9, wherein the supplemental resource is for use in device-to-device communication during handover of the terminal device from the source cell to the target cell.

11. The apparatus of claim 10, wherein the first timer is T304 and the second timer is T311.

12. The apparatus of claim 10, wherein the receiver further determines a second time interval commencing upon unsuccessful target cell selection at the expiry of the second timer, in which a new resource for use in device-to-device communication is made available to the terminal device, wherein the second time interval expires upon expiry of a third timer.

13. The apparatus of claim 12, wherein the first timer is T302, the second timer is T311, and the third timer is T301.

14. The apparatus of claim 12, wherein the controller further receives information about the new resource from the target cell of the wireless communication network.

15. A method implemented at a network device in a wireless communication network, comprising:
   preparing for transmission to a terminal device, information about a supplemental resource for use by the terminal device during a handover of the terminal device from a source cell to a target cell, the information including a time interval in a portion of a transition period of the handover, in which the supplemental resource is available to the terminal device during the time interval, wherein a first timer and the time interval commence at a receiving of a connection reconfiguration message from the source cell by the terminal device, wherein when the first timer expires without the terminal device completing target cell selection, utilizing a second timer to add time to the first timer to continue the time interval for target cell selection at the terminal device, and wherein the time interval ends upon successful target cell selection by the terminal device or upon expiry of the second timer; and
   sending the information to the terminal device by the source cell.

16. The method of claim 15 further comprising sending information about a second time interval to commence upon unsuccessful target cell selection by the terminal device at the expiry of the second timer, in which a new resource for use in device-to-device communication is made available to the terminal device, wherein the second time interval expires upon expiry of a third timer.

17. The method of claim 16, wherein the first timer is T302, the second timer is T311, and the third timer is T301.

18. An apparatus implemented at a network device in a wireless communication network, comprising:
   a controller configured to cause a transmission of information to a terminal device, the information about a supplemental resource for use by the terminal device during a handover of the terminal device from a source cell to a target cell, the information including a time interval in a portion of a transition period of the handover, in which the supplemental resource is available to the terminal device during the time interval, wherein a first timer and the time interval commence at a receiving of a connection reconfiguration message from the source cell by the terminal device, wherein when the first timer expires without the terminal device completing target cell selection, utilizing a second timer to add time to the first timer to continue the time interval for target cell selection at the terminal device, and wherein the time interval ends upon successful target cell selection by the terminal device or upon expiry of the second timer.

19. The apparatus of claim 18, wherein the controller further causes a transmission of information about a second time interval commencing upon unsuccessful target cell selection by the terminal device at the expiry of the second timer, in which a new resource for use in device-to-device communication is made available to the terminal device, wherein the second time interval expires upon expiry of a third timer.

20. The apparatus of claim 19, wherein the first timer is T302, the second timer is T311, and the third timer is T301.

* * * * *